(12) United States Patent
Alasaarela et al.

(10) Patent No.: US 9,183,462 B2
(45) Date of Patent: Nov. 10, 2015

(54) COMPARISON METHOD AND COMPARATOR FOR GRAPHIC COMPARISON OF TARGETS

(75) Inventors: Markku Alasaarela, Oulu (FI); Jaakko Alasaarela, Oulu (FI); Esko Alasaarela, Oulu (FI)

(73) Assignee: ZEF Solutions Oy, Oulu (FI)

( * ) Notice: Subject to any disclaimer, the term of this patent is extended or adjusted under 35 U.S.C. 154(b) by 303 days.

(21) Appl. No.: 13/990,580

(22) PCT Filed: Nov. 30, 2011

(86) PCT No.: PCT/FI2011/051059
§ 371 (c)(1),
(2), (4) Date: Jul. 22, 2013

(87) PCT Pub. No.: WO2012/072882
PCT Pub. Date: Jun. 7, 2012

(65) Prior Publication Data
US 2013/0301937 A1   Nov. 14, 2013

(30) Foreign Application Priority Data

Dec. 3, 2010   (FI) ................................. 20106280

(51) Int. Cl.
*G06K 9/68* (2006.01)
*G06K 9/62* (2006.01)
(Continued)

(52) U.S. Cl.
CPC .......... *G06K 9/6202* (2013.01); *G06Q 30/0282* (2013.01); *G06K 9/00147* (2013.01); *G06K 9/6267* (2013.01); *G06Q 30/0203* (2013.01)

(58) Field of Classification Search
CPC ............ G06K 9/6267; G06K 9/00147; G06Q 30/0203
See application file for complete search history.

(56) References Cited

U.S. PATENT DOCUMENTS 5,041,972 A * 8/1991 Frost ....................... G06F 17/18
   705/7.32
6,438,579 B1   8/2002 Hosken
(Continued)

FOREIGN PATENT DOCUMENTS

KR   10-09705878 B1   7/2010

OTHER PUBLICATIONS

English translation of Vaalikoneen käyttö lyhyesti, ZEF Solutions Oy, MTV3.fi, 2008, http://web-archive.org/web/20080413022629/http://kone.zef.fi/etsi.php?.*
International Search Report for parent application PCT/FI2011/051059, having a mailing date of Apr. 24, 2012.
Finnish Search Report for priority application FI 20106280, dated Oct. 4, 2011.
(Continued)

*Primary Examiner* — Nirav G Patel
*Assistant Examiner* — Jonathan S Lee
(74) *Attorney, Agent, or Firm* — Andrus Intellectual Property Law, LLP

(57) ABSTRACT

A method, a data network arrangement and a computer program product by which a comparator can be implemented in a data network. The user of the comparator stores his evaluation of the properties included in the targets to be evaluated in a database in the server in the data network using a graphic one- or two-dimensional evaluation frame. In the comparator the comparator user's evaluations are compared to property evaluations given by a reference user. When calculating the total accuracy percentage of the comparison the evaluations given by the comparator user are weighted with a weighting coefficient, which is obtained by normalizing first the importance evaluations of all the properties given by the reference user and by using the normalized importance evaluation of a certain property as the weighting coefficient for this property.

18 Claims, 6 Drawing Sheets

(51) Int. Cl.
*G06Q 30/02* (2012.01)
*G06K 9/00* (2006.01)

(56) References Cited

U.S. PATENT DOCUMENTS

| | | | |
|---|---|---|---|
| 6,749,436 | B1 | 6/2004 | Dannenberg |
| 7,693,743 | B2 | 4/2010 | Alasaarela |
| 2003/0182370 | A1 | 9/2003 | Alasaarela |
| 2004/0133461 | A1* | 7/2004 | Hayashi et al. .............. 705/10 |
| 2007/0156537 | A1 | 7/2007 | Peters |
| 2009/0083631 | A1 | 3/2009 | Sidi et al. |
| 2012/0130934 | A1* | 5/2012 | Brillhart ............ G06Q 30/0203 706/46 |
| 2014/0172625 | A1* | 6/2014 | Reisman ................ G06Q 30/02 705/26.7 |
| 2015/0089399 | A1* | 3/2015 | Megill et al. .............. 715/753 |

OTHER PUBLICATIONS

Kleinnijenhuis, Jan and Krouwel, Andre P., "Simulation of Decision Rules for Party Advice Websites", (online), last modified on Mar. 12, 2008, 8 pages.

"Vaalikoneen kaytto lyhyesti", ZEF Solutions Oy, MTV3,fi (online), Apr. 13, 2008, available at http://web archive.org/web/20080413022629/http://kone.zef.fi/etsi.php?, one page.

Ladner, Andreas and Pianzola, Joelle, "Do Voting Advice Applications Have an Effect on Electoral Participation and Voter Turnout? Evidence from the 2007 Swiss Federal Elections", Lecture Notes in Computer Science, 2010, vol. 6229/2010, pp. 211-224, Second IFIP WG 8.5 International Conference, ePart 2010, Aug. 29-Sep. 2, 2010, Lausanne, Switzerland, DOI.

* cited by examiner

COMPARISON METHOD AND COMPARATOR FOR GRAPHIC COMPARISON OF TARGETS

CROSS-REFERENCE TO RELATED APPLICATIONS

This application is the U.S. national stage application of International Application No. PCT/FI2011/051059, filed Nov. 30, 2011, which International application was published, on Jun. 7, 2012 as International Publication No. WO 2012/072882 A1 in the English language and which application is incorporated herein by reference. The International application claims priority of Finnish Patent Application No. 20106280, filed Dec. 3, 2010, which application is incorporated herein by reference.

BACKGROUND

The invention relates to a comparator, a comparison method utilised therein and a data network arrangement for implementing the comparison of the properties of a comparison target utilising a user's data processing device and a graphic comparison tool in the comparator. The invention also relates to a computer program to be utilised in the comparator.

The comparing of two or more comparison targets can be implemented by utilising a data network. The comparison target may for example be a product, a service, a travel destination, a person etc. The purpose of the comparison is to produce a final result, on the basis of which a target can be presented to a person performing the comparison from several possible comparison targets, which target best corresponds to the needs and desires of the person performing the comparison with regards to the properties used in the comparison, which describe the comparison target.

U.S. Pat. No. 7,693,743 presents a data collection and presentation method functioning in a data network, where a stepless two-dimensional data collection and presentation manner is utilised for collecting opinions and presenting the results of the inquiry. The presented manner is known as a fourfold model. In the method according to the publication the operation is based on collecting evaluation data with the aid of a data network from persons selected by the person administrating the inquiry, the so-called inquiry creator, in two or more dimensions. The evaluation results of each evaluator are normalised per respondent, so that the average of the evaluation points of the evaluator entered into the fourfold is set in the origin and the dispersion (standard deviation or some other value describing dispersion) in a set standard value for each person performing the evaluation. With the described method the given responses can be scaled so that the evaluator's order of importance of different properties of the evaluation target are detected from the inquiry results, even if the responses given by some evaluator of the properties being evaluated were to be concentrated close together. Additionally the order of importance given to the properties by a single evaluator can be scaled with the responses given by other participants in the inquiry. The scaled result can also be called a normalised result.

The two-dimensional inquiry frame, the fourfold, has been used also in a so-called comparator, which can be used for example via the Internet. Reference responses given by a so-called reference user have been entered into the comparator, which reference responses illustrate as realistically as possible certain selected properties of the comparison target. The actual user of the comparator responds to the same questions as the reference user, whereby a conclusion can be made with the aid of the inquiry regarding how congruent the opinion of the actual user and the opinion of the reference user are regarding the evaluated properties of a certain evaluation target.

One application of the comparator is a so-called election machine, by using which a private person can compare his own opinions against the opinions of the persons nominated in the election.

The comparator can comprise several different two-dimensional question fourfolds and/or one-dimensional evaluation lines.

A single question fourfold of the comparator consists of two properties to be examined, which are set perpendicularly against each other in the displayed fourfold. With the aid of the question fourfold the properties to be compared are in some way related to each other. Each property is in the question fourfold described for example with numerical values 0-100%. Any values can naturally be selected as the numerical values of the end points, for example −10 and +10. Alternatively the properties to be compared can be described with word pairs, e.g. disagree↔agree, bad↔good or unimportant↔important.

In the examples in FIGS. 1a-1c the numerical value 0% of the horizontal axis of the fourfolds is situated in the left edge of the question fourfold and the numerical value 100% in the right edge of the question fourfold. Correspondingly the numerical value 0% of the vertical axis of the question fourfold is situated in the lower edge of the question fourfold and the numerical value 100% in the top edge of the question fourfold. What corresponds to a numerical value of 0% or 100% for each property is based on the definition made by the creator of the comparison procedure.

A person using the two-dimensional comparator, either a reference user of an actual user, sees two properties of the comparison target, one on the horizontal axis and one on the vertical axis. Generally the ends of the axes of the question fourfold describe opposite pairs of the same property. By using the two opposite pairs included in the question fourfold the comparator user can give his own evaluation of both examined properties by placing one evaluation point in a selected spot in the fourfold.

In addition to the two-dimensional fourfold the comparator can advantageously utilise also a one-dimensional evaluation line. The ends of the evaluation line in some way represent opposite pairs of the compared property.

FIG. 1a shows a principled model of a question fourfold 1 to be utilised in the comparator. The user of the question fourfold steplessly moves a response cursor 2 to a desired spot in the question fourfold 1. This stepless aiming possibility has been illustrated with four arrows pointing out from the cursor 2. When the response cursor 2 is according to the user in a spot, which corresponds to his opinion or evaluation with regards to the two properties shown in the fourfold, the user locks the response cursor 2 with a function related to the data processing device he uses.

FIGS. 1b and 1c show examples of the above-mentioned comparator and possible comparison fourfolds 7a therein. In FIG. 1b the evaluation of the user is locked in spot 4 in the comparison fourfold 7a. This evaluation can be graphically compared to a corresponding evaluation 3 given by the reference user of the examined property. In the example in FIG. 1b the evaluations by the user and the reference user of the evaluated property are in every way almost opposite.

FIG. 1c shows a situation, where the users opinion 5 and the reference user's opinion 3 are congruent in one dimension (on the horizontal axis). In relation to the second axis (the vertical axis) there is a clear difference in the opinions. The graphic presentation according to the comparison fourfold 7a can illustratively present the comparison results of the inquired properties.

FIG. 1d shows a one-dimensional evaluation line 8 and an opinion/evaluation 6 presented by a user about an evaluation statement presented in connection with some property. In the example in FIG. 1d the left end of the line illustrates a situation, where the user agrees with the presented statement regarding an examined property. The right end of FIG. 1d illustrates a situation, where the user completely disagrees with the presented statement. The corresponding statement is also presented to the reference user/users of the comparator. By proceeding thus it is possible to calculate an accuracy percentage between the user and different reference users.

In the above-described examples the congruency between the reference user's and the actual user's evaluation can be expressed mathematically also with the following expression:

$$A = \left[1 - \frac{|X_K - X_E|}{N}\right] * 100, \quad (1)$$

in which:
N is an integer number, with which the axis of the question fourfold 1 (or the evaluation line 8) is divided into equally large parts (N is advantageously a number between 100 and 1000)
$X_K$ is the value of the user's response point between 0 and N
$X_E$ is the value of the reference user's response point between 0 and N and
A is the congruency of the reference user's and respondent's points expressed as an accuracy percentage for one axis of the question fourfold or evaluation line.

The total percentage S of correlation of the reference user's and actual user's responses is obtained with the equation:

$$S = \sum_{j=1}^{n} \frac{A_j}{n}, \quad (2)$$

in which:
S is the congruency percentage of all the responses,
$A_j$ is the congruency of axis j as an accuracy percentage and
n is the total number of axes included in the utilised fourfolds and/or evaluation lines.

The comparator uses the equations (1) and (2) to calculate the congruency of evaluations given by the user and reference user regarding a certain comparison target. If necessary, the comparator calculates a corresponding congruency percentage illustrating the congruency for all comparison targets selected by the user.

SUMMARY

It is an object of the invention to present a comparator to be utilised in a data network and a comparison method, where individual responses given by the actual user on his data processing device are weighted with a property-specific weighting coefficient calculated by the comparator. An individual comparator user can compare one or more selected comparison targets against his own evaluations so that the evaluations in the direction of the axis illustrating the importance of a certain property, which evaluations have been given to the comparator by the reference evaluator, are taken into account as a sort of weighting coefficient also when placing the evaluations of the actual user before the accuracy percentage.

The objects of the invention are attained with a comparator implemented in an electric data network, which comprises computer program means for storing evaluations given by a reference user/users with their data processing devices in a database connected to a server implementing the comparator regarding targets selected as the comparison targets. The evaluations of the reference user represent the selected properties of some evaluation target as objectively as possible. The comparator also comprises computer program means for storing the evaluations given by the actual user on his data processing device regarding the corresponding properties of the comparison target. The comparator advantageously also comprises a database of property-specific weighting coefficients formed based on the evaluations of the reference user/users or the response manner of the actual user. The weighting coefficients included in the database are utilised in the comparator for classifying targets based on differences measured in connection with evaluations by the actual user and/or evaluation of a certain property by the reference user/users.

It is an advantage of the invention that the comparator can be used to weight individual evaluations given by the actual user regarding the properties of the evaluation target with a weighting coefficient calculated from the evaluations given by the reference user/users. With the aid of the weighting coefficient it is possible to give additional weight to such evaluated properties, which based on the reference user are essential for a decision made based on the evaluation.

It is further an advantage of the invention that the comparator can be used to weight individual evaluations of the evaluated target given by an actual user with a weighting coefficient, which can be derived from the evaluation behaviour of the evaluator.

It is additionally an advantage of the invention that the actual user can compare evaluation results corrected with the weighting coefficients of different reference groups.

The comparison method according to the invention comprises a step where at least one reference user gives an evaluation of the properties of a comparison target with a graphic evaluation frame on the reference user's data processing device and the evaluations given by the reference user are stored in a database of a server implementing the functions of the comparator a step where the evaluations describing the degree of importance of properties included in the reference user's evaluations are normalised with the graphic evaluation frame of the server, so that an average of the importance evaluations of all properties is in the origin in the center of the used graphic evaluation frame and the standard deviation of the importance evaluations has a predetermined size a step where the comparator user gives an evaluation of the evaluated property with the user's data processing device, which is connected to a data transfer network, and the evaluation is stored in the server a step for determining an accuracy percentage describing the congruency of the evaluations of the comparator user and reference user in the server implementing the comparator and a step for presenting on the comparator user's data processing device a total accuracy percentage for all properties obtained from the congruency comparison created in the server, characterised in that it also comprises a step where the accuracy percentage (A) of at least one property of the comparison target is corrected in the server with a weighting coefficient ($K_E$, $K_{E1}$) determined at least from the reference user's evaluations and a step where the comparison targets of the comparator are presented in an order determined by the total accuracy percentage ($S_E$, $S_{E1}$) corrected with the weighting coefficient on the comparator user's data processing device.

A data network arrangement according to the invention comprises a data transfer network a server, comprising means for providing the graphic evaluation frame as a www-page on the comparator users' data processing devices a database for storing evaluations given with the graphic evaluation frame means for the reference user to give a property evaluation related to the graphic evaluation frame, for storing and comparing the evaluation against the corresponding property evaluation by the comparator user means for calculating a property-specific accuracy percentage (A) and means for presenting the comparison result graphically on the screen of the comparator user's data processing device in an order determined by the total accuracy percentage, and at least one comparator for the user of the comparator on the user's data processing device to give an evaluation with the graphic evaluation frame of at least one property of the compared target, characterised in that it additionally comprises in the server means for weighting the accuracy percentage (A) of at least one property of the comparison target with a weighting coefficient ($K_E$) determined at least from the reference evaluator's evaluations and means for presenting the comparison targets in an order determined by the total accuracy percentage ($S_E$, $S_{E1}$) corrected with the weighting coefficient on the comparator user's data processing device.

The computer program product according to the invention comprises computer program code means stored on a computer-readable storage means, and are characterised in that it comprises computer program code means for correcting the accuracy percentage (A) of at least one property of the comparison target with a weighting coefficient ($K_E$, $K_{E1}$) determined at least from the evaluations of a reference evaluator, and computer program code means for presenting the comparison targets in an order determined by the corrected total accuracy percentage ($S_E$, $S_{E1}$) on the comparator user's data processing device.

Some advantageous embodiments of the invention are presented in the dependent claims.

The basic idea of the invention is the following: Comparison of the evaluation targets is performed in a comparator implemented by programming in a server in a data network, which comparator comprises the computer program means according to the invention. The computer program means comprise evaluation questions, which are determined based on the evaluation target, which questions contain such properties or features to be evaluated, which are essential for the comparison to be done. The inquiry questions are presented to a reference user/users of the comparator advantageously on a graphic evaluation frame, which can be created on the screen of the comparator user's data processing device. The graphic evaluation frame can either be an evaluation fourfold or an evaluation line. The actual user of the comparator can give his evaluation utilising either the two-dimensional fourfold or the one-dimensional evaluation line.

The computer program means also comprise a database formed from the evaluations of reference users, the data comprised in which is advantageously used to weight individual evaluations of the properties given by the actual user in different parts of the fourfold or evaluation line. Thus the evaluation points, which are central and important for the actual user, are taken into account with more weight in the final evaluation result containing several different evaluation points than the evaluation results which turn out to have a smaller importance.

BRIEF DESCRIPTION OF THE DRAWINGS

In the following, the invention will be described in detail. In the description, reference is made to the appended drawings, in which.

DETAILED DESCRIPTION OF THE DRAWINGS

FIGS. 1a-1d are described in connection with the description of prior art.

Figure 1A:
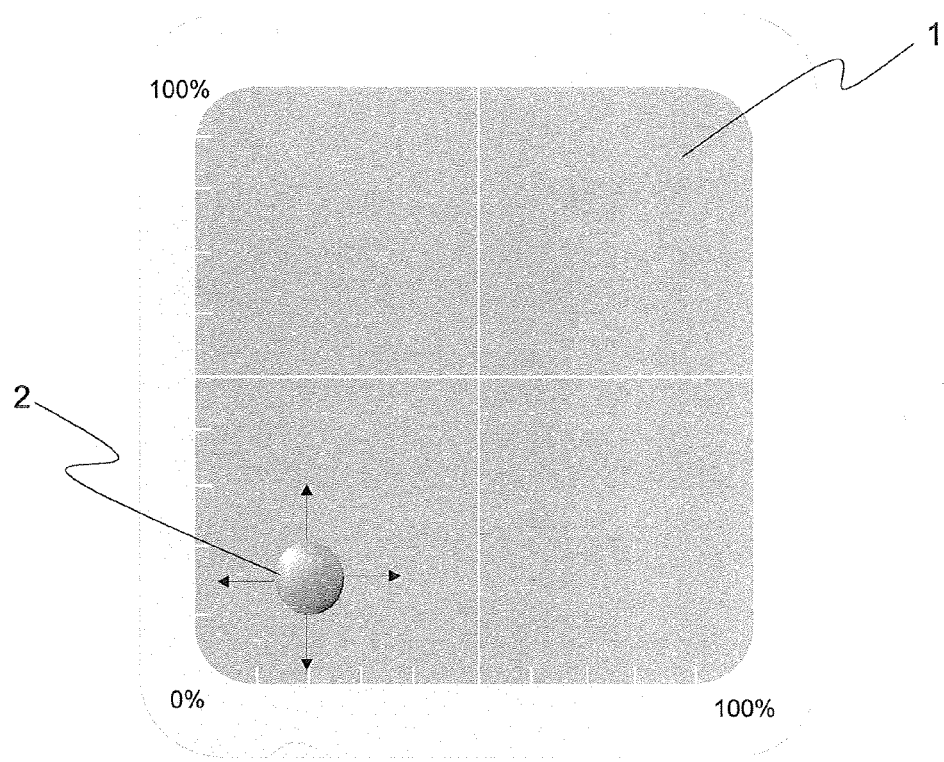
FIG. 1a shows as an example a question fourfold according to prior art.
Figure 1B:
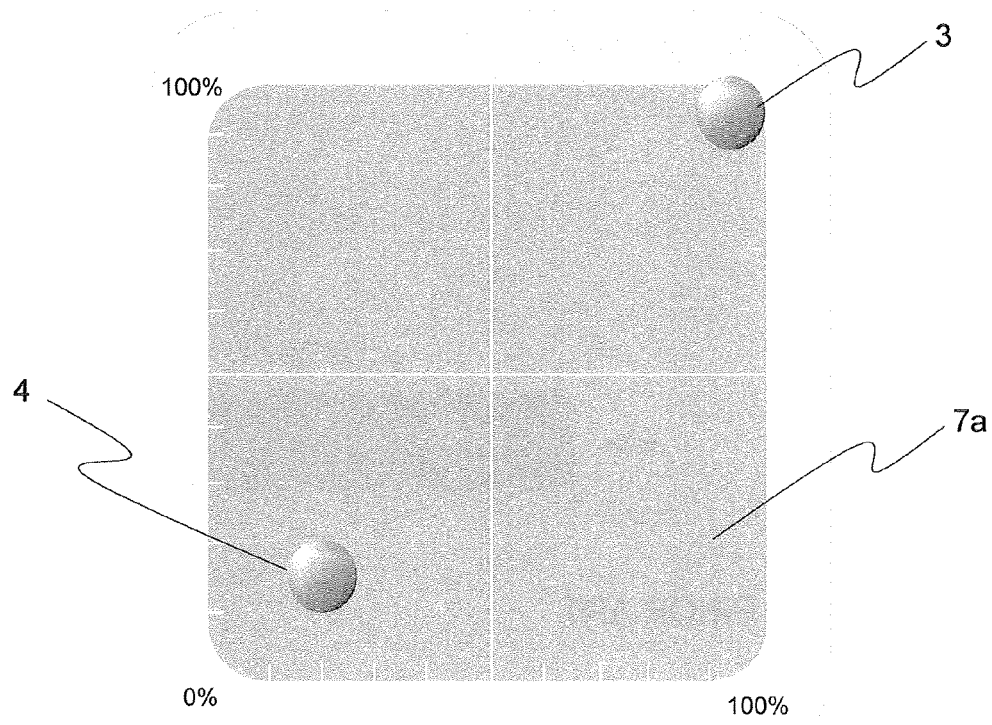
FIG. 1b shows an example of a comparison of evaluations given by a user and a reference user regarding one property.
Figure 1C:
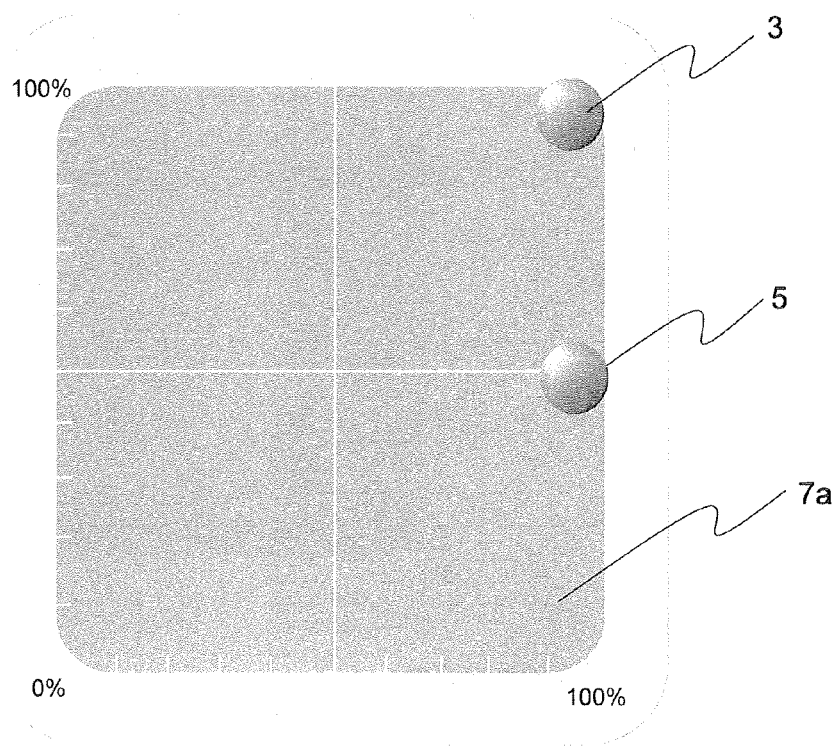
FIG. 1c shows a second example of a comparison of evaluations given by a user and a reference user regarding one property.
Figure 1D:
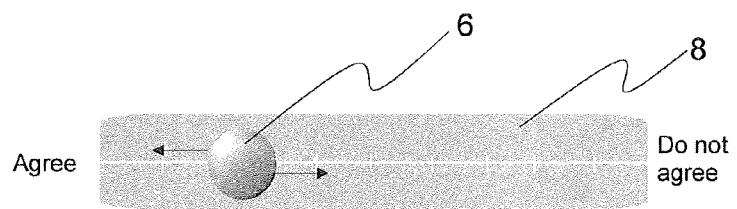
FIG. 1d shows an example of a one-dimensional evaluation line used in the comparator.
Figure 2A:
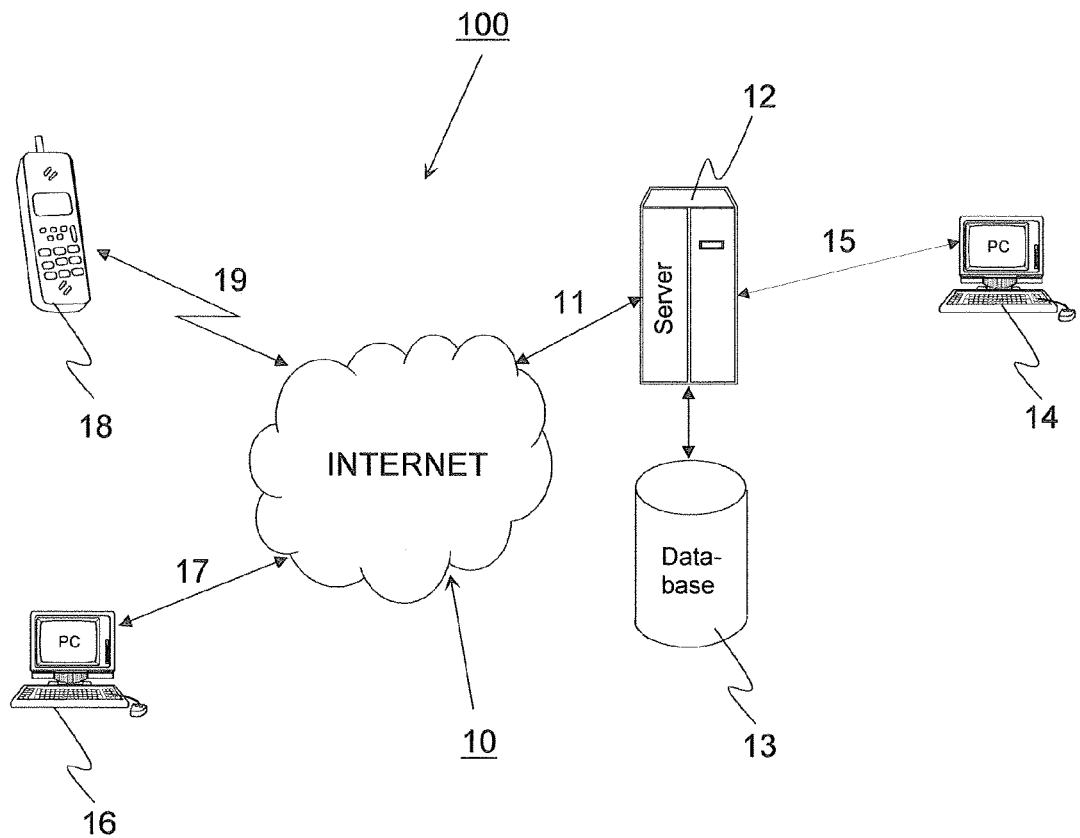
FIG. 2a shows as an example a comparator arrangement according to the invention.

FIG. 2a shows as an example a comparator arrangement 100 according to the invention. Users of the comparator connect via the Internet 10 to a server 12, wherein a computer software has been installed, which implements the functions of the comparator. Each user can open from the server 12 the comparator according to the invention functioning therein via a www-page found on the server.

FIG. 2a shows two exemplary data processing devices 16 and 18, which the comparator user can utilise when making the comparison. Reference 16 shows a conventional computer, which is connected to the Internet 10 via a fixed data communication connection 17. Reference 18 shows as an example a device connecting to the Internet via a wireless data transfer connection 19. The wirelessly functioning device 18 can for example be a terminal of a cellular network, a palmtop computer or a portable computer equipped with a WLAN feature. When it is desirable to use the comparator, the www-page of the comparator available on the server 12 is opened on the data processing device. A response is given to the questions of the comparator by using a graphic user interface of the comparator which opens on the screen of the data processing device 16 or 18, which user interface is advantageously a question fourfold or a comparison line. Each individual question fourfold or comparison line opens up in the comparator as a new www-page.

The server 12, wherein the computer program implementing the comparator according to the invention is installed, is advantageously connected with a fixed data transfer connection 11 to the Internet 10.

A computer 14, which is used for defining the fourfolds and evaluation lines included in the comparator, is connected to the server 12 advantageously with a fixed data transfer connection 15. The reference users participating in the comparison advantageously also enter their evaluation with the computer 14.

Figure 2B:
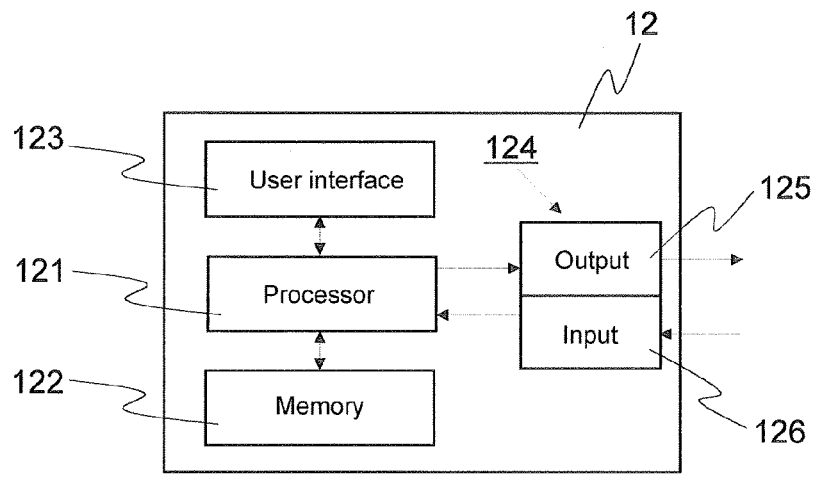
FIG. 2b shows as an example a server utilised in the implementation of a comparator according to the invention.

FIG. 2b shows the functional main parts of the server 12 utilised in the implementation of the comparator according to the invention. The server 12 comprises a processor or processor means 121, which comprise an arithmetic logic unit, a number of different registers and control circuits. A data storing arrangement 122, such as memory unit or memory means, whereon computer-readable information, programs or user data can be stored, has been connected to the processor means 121. The memory means 122 typically contain memory units, which allow both reading and writing functions (Random Access Memory, RAM), and memory units containing non-volatile memory, from which data can only be read (Read Only Memory, ROM).

The server 12 also comprises an interface element 124, which comprises an inlet or inlet means 126 for receiving data from the data communications network 10 from the comparator users' data processing devices 16 and 18, from the data processing device 14 or from the separate database device 13. The data received with the inlet means 126 is transferred to be processed by the processor means 121 of the server 12. The interface element 124 of the server 12 also comprises an outlet or outlet means 125, with which data is transferred from the processor means of the server 12 either via a data transfer network 10 to the comparator users' data processing devices 16 and 18 or to external data processing devices 13 or 14.

The server 12 advantageously also comprises a user interface 123, which comprises means for receiving data and/or control commands from the user of the server 12. The user interface 123 can for example comprise a keyboard, a touch screen, a microphone and a speaker.

The processor means 121, the memory means 122, the interface element 124 and the user interface 123 are electrically joined together to systematically execute received and/or stored data or information in accordance to predetermined and essentially pre-programmed operational sequences. Such operational sequences also include the operational sequences described in connection to FIGS. 3-5, which implement the functions of the comparator according to the invention. The detailed implementation of the logical units of the server in FIG. 2b are prior art to a person skilled in the art.

In an advantageous embodiment of the invention a part of the server's 12 memory 122 has been reserved for a database 13, which comprises the evaluation results of the properties of the comparison target given by both the reference users and the actual users.

The number of graphic evaluation frames, such as question fourfolds and/or evaluation lines, included in a certain comparison depends on the subject matter of the performed comparison and on how easy the comparison has been made for the user. The number of properties to be evaluated and the preciseness of the results striven for in the comparison are thus taken into account. The comparison target may for example be a product comparison, a service comparison, an election machine, a risk evaluation, a quality evaluation, a workplace wellbeing study or a job aptitude test. The larger the number of question fourfolds or evaluation lines with their questions that is utilised in the comparison, the more precise the result of the inquiry will turn out.

With the aid of the comparator according to the invention an individual user can compare his needs, wishes and/or opinions to one or more comparison targets. The user of the comparator can advantageously select the desired comparison targets from a complex formed from several comparison targets. The reference evaluations for a certain comparison target utilised in the comparator are advantageously entered into the comparator by a person, a so-called reference user, who knows the comparison target and its properties well.

In an advantageous embodiment of the invention the evaluations given by each reference evaluator regarding the properties of the comparison target are normalised in relation to the used evaluation axes, so that the average of the evaluation points entered by the reference users on the fourfold or evaluation line is set in the origin and the dispersion (standard deviation or some other value describing dispersion) in a set standard value.

In a second advantageous embodiment of the invention the normalisation of the evaluations given by the reference users is performed in relation to only one comparison axis. This comparison axis advantageously describes the importance of a certain property of an evaluation target to be compared in comparison to other properties.

When the user has given his own evaluations of the properties of the evaluation target, an accuracy percentage is then calculated for each comparison target included in the comparison. When calculating the accuracy percentage the fact is taken into account that in each evaluation from a single user, the evaluation result given by the user is weighted with a property-specific weighting coefficient. The property-specific weighting coefficient can advantageously be determined for example based on the normalised evaluations of the reference user/users or from measurement data describing the actions of the user in connection with the evaluation event.

The accuracy percentage of the user's evaluations and the property of one comparison target is calculated in the comparator according to the invention advantageously with the equation:

$$A_E = \left[1 - \frac{|X_K - X_E|}{N}\right] * K_E * 100, \quad (3)$$

in which:
N is an integer number, with which one axis of the question fourfold (or the evaluation line 8) is divided into equally large parts (N is advantageously a number between 100 and 1000)
$X_K$ is the value between 0 and N of the response point given by the user
$X_E$ is the value between 0 and N of the response point given by the reference user $K_E$ is the weighting coefficient calculated from the evaluations of the reference user for an individual evaluation target and $A_E$ is the congruency of the reference user's and the user's points corrected with the weighting coefficient, expressed as an accuracy percentage.

The total accuracy percentage $S_E$ of correlation of the evaluations of the actual user and the reference user corrected with the weighting coefficient is obtained in the comparator with the equation (4):

$$S_E = \sum_{j=1}^{n} \frac{A_{je}}{n}, \quad (4)$$

in which $S_E$ is an accuracy percentage taking into account the weighting coefficients of all the responses $A_{je}$ is the congruency of axis j corrected with the weighting coefficient as an accuracy percentage and n is the total number of axes included in the fourfolds or evaluation lines.

With the comparator it is possible to perform comparisons, where the user compares his own evaluations to a summary result obtainable from the evaluations of a certain reference group. In this embodiment each user can advantageously define a desired comparison group by using frame of reference questions. When the comparison group has been formed, the server 12 retrieves from the database 13 a summary file compiled from the evaluations given by the persons belonging to the comparison group. The comparator has advantageously calculated a summary fourfold for the comparison group based on the responses. The dispersion result of the opinions of the comparison group can advantageously be used as a weighting coefficient for the user's evaluation of an individual property.

Figure 3:
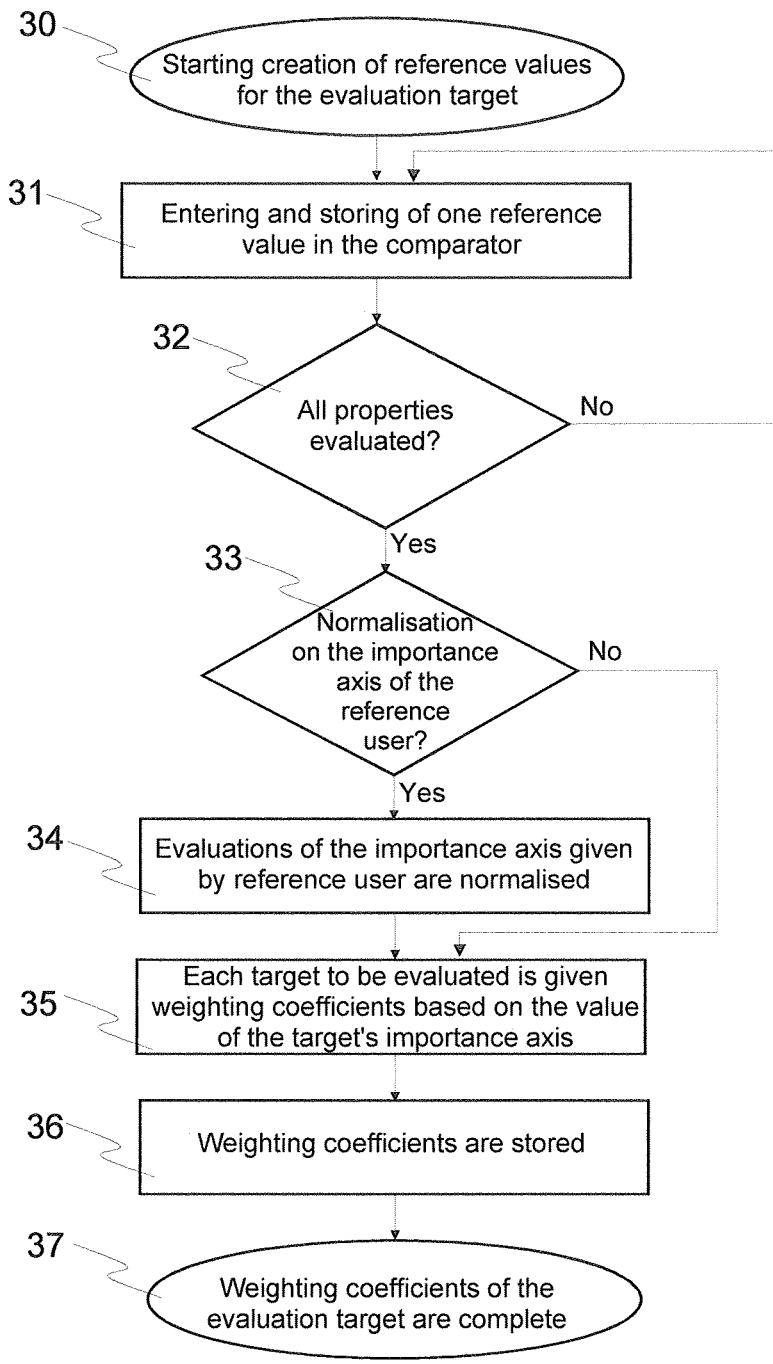
FIG. 3 shows as an exemplary flow chart the functional main steps of the comparator according to the invention, when the weighting coefficients are formed based on evaluations given by a reference user.

FIG. 3 shows with the aid of an exemplary flow chart the defining of the property-specific weighting coefficients to be utilised in the comparator according to the invention. Step 30 in FIG. 3 is preceded by a step of creating questions and statements in the comparator, which step is not shown. In the creation step of the comparator the comparison target itself and the properties to be compared in relation to the comparison target are defined.

The fourfold questions and evaluation line questions created during the creating step are advantageously stored in the server 12 according to commands from the computer 14 controlling the comparator.

The flow chart in FIG. 3 illustrates the comparator according to the invention in connection with the creation of the weighting coefficients. In order to create the weighting coefficients the reference user enters his evaluations of different properties of one comparison target.

In step 30 the reference user starts the comparator on a suitable data processing device 16, 18. With the data processing device 16, 18 a www-based comparator service including a graphic comparison frame, which service is available from the server 12 via the Internet, is opened. In this step the used data collecting format and the used comparison method are advantageously presented to the reference user.

In step 31 the reference user enters his evaluation of one property of the comparison target on his data processing device. The evaluation given by the reference user of said property is stored at least temporarily in a memory part of the server 12, which is available to the comparator.

Step 32 consists of a checking in the comparator to see if the reference user has given his evaluation of all the properties of the comparison target. If some property has not been evaluated, the evaluation process returns to step 31, where the reference user gives his evaluation of the next still unevaluated property of the compared target in the comparator.

If it is in step 32 found that the reference user has given his evaluation of all the properties to be evaluated of the comparison target, then the process moves to step 33. In step 33 a decision is made regarding whether the evaluations of the properties given by the reference user are normalised in the comparator in relation to at least one property and/or evaluation axis or not. If the evaluations of the reference user are not normalised, the process moves directly to step 35.

If it is in step 33 decided that at least some of the evaluations given by the reference user regarding the properties of the comparison target will be normalised in the comparator, then the process moves to step 34. In step 34 the evaluations given by the reference user regarding the properties of the comparison target are normalised in the comparator, so that the average of the evaluation points entered into the question fourfold or the evaluation line is set in the origin and the dispersion at a preset standard value. In other words the location of the original evaluation points entered by the reference evaluator are moved in the fourfold or the evaluation line, so that the above-described conditions are fulfilled. Advantageously the normalisation is done at least for the evaluations of the reference evaluator, which values are in the direction of the "importance" axis of the question fourfold. By using normalisation, the mutual importance relationship between different properties can be highlighted. This is advantageous especially in those cases, where the reference user's evaluations in the direction of the "importance axis" are concentrated in some part of the question fourfold.

In step 33 each property to be evaluated of the comparison target in the comparator is given its own weighting coefficient. This weighting coefficient is used to weight the accuracy percentage calculated from the user's and reference user's evaluations. When one or more reference users are utilised in the comparator, the property-specific weighting coefficients can be determined either from the original evaluations given by the reference user or from their normalised values. At least the axis, the values in the direction of which illustrate the importance of the evaluated property in the evaluation of the comparison target, is advantageously normalised. In this embodiment the weighting coefficients correspond to the values of the individual normalised property evaluations. The weighting coefficient can advantageously be a number between 0.0 and 1.0.

In step 36 the formed property-specific weighting coefficients of the comparison target are stored in the memory part of the server 12, which is available to the comparator. The creation and storage of the weighting coefficients ends in step 37.

Figure 4:
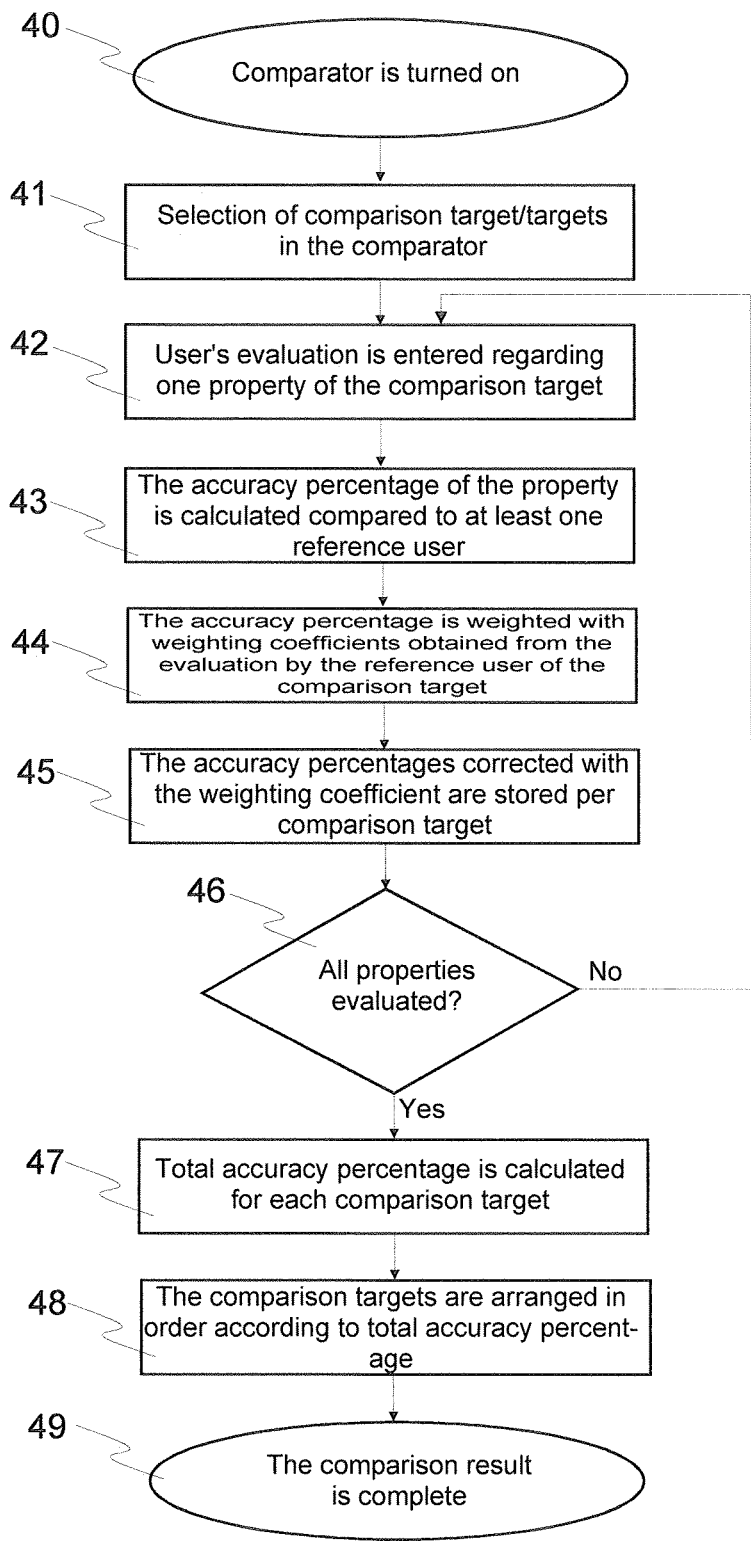
FIG. 4 shows as an exemplary flow chart the functional main steps of the comparator according to the invention, when weighting coefficients calculated from a reference user's evaluations are utilised in the comparison.

FIG. 4 shows as an exemplary flow chart the main steps of the operation of the comparator according to the invention when property-specific weighting coefficients formed from the evaluations by the reference user/users of the comparison target are utilised in the comparator.

In step 40 the person performing the comparison starts the comparator according to the invention. In step 41 the user selects with his data processing device the comparison target/targets to be used in the comparator. Each comparison target has previously been evaluated by at least one so-called reference user, who knows all the properties of the individual comparison target, which properties are utilised in the comparator during the comparison. Evaluations of different comparison targets are advantageously performed by different reference evaluators.

In step 42 the user enters his own evaluation in the comparator with his data processing device regarding an individual property being evaluated. The user can enter his evaluation into the comparator advantageously either using a fourfold or an evaluation line. Both embodiments utilise a stepless graphic response arrangement, whereby the user sets his evaluation result in the graphic evaluation frame created on the screen of his data processing device in a freely selected spot.

In step 43 the accuracy percentage A of the evaluations of the comparator user and at least one reference user of the comparison target is calculated in the comparator using the equation (1).

In step 44 the accuracy percentage A illustrating the congruency of a single property being evaluated is weighted in the comparator according to the equation (3) with a weighting coefficient $K_E$ determined from the evaluation given by the reference user of the comparison target. As a final result is received an accuracy percentage value $A_E$ illustrating the congruency of one evaluated property, corrected with the weighting coefficient.

In step 45 the numerical value $A_E$ illustrating the congruency of one evaluated property corrected with the weighting coefficient is stored at least temporarily in the memory part of the server 12 assigned to the comparator.

Step 46 consists of checking whether the comparator user has given his evaluation of all the properties to be evaluated. If even one property to be evaluated is still not evaluated, then the comparison process returns to step 42, where the comparator user gives his evaluation of the next still unevaluated property.

If it is in step 46 found that the comparator user has given his evaluation of all the properties to be evaluated of the target/targets, then the comparison process proceeds to step 47, where a total accuracy percentage $S_E$ taking into account the property-specific weighting coefficients is calculated in the comparator using the equation (4).

In step 48 the targets being compared are placed in the comparator in an order determined by the total accuracy percentage $S_E$.

The use of the comparator ends in step 49, where the comparison results are presented to the comparator user on the screen of his data processing device in the order according to the total accuracy percentage $S_E$.

As the reference user in FIG. 4 it is possible to select, instead of an individual reference user, some comparison group suitable for the comparator user. The comparison group can be a comparison group created by the administrator of the comparator or a comparison group independently created by the inquiry user with the aid of suitable frame of reference data. After the definition of the comparison group in step 43, a summary of the evaluations given by the comparison group on the graphic evaluation frame 1 or 8 is retrieved from the database 13 in the server 12. If it is a question of a comparison group created in the comparator beforehand, the summary of whose evaluations is updated in real-time, a real-time graphic summary file depicting the opinions of the comparison group can be directly retrieved from the database 13.

Figure 5:
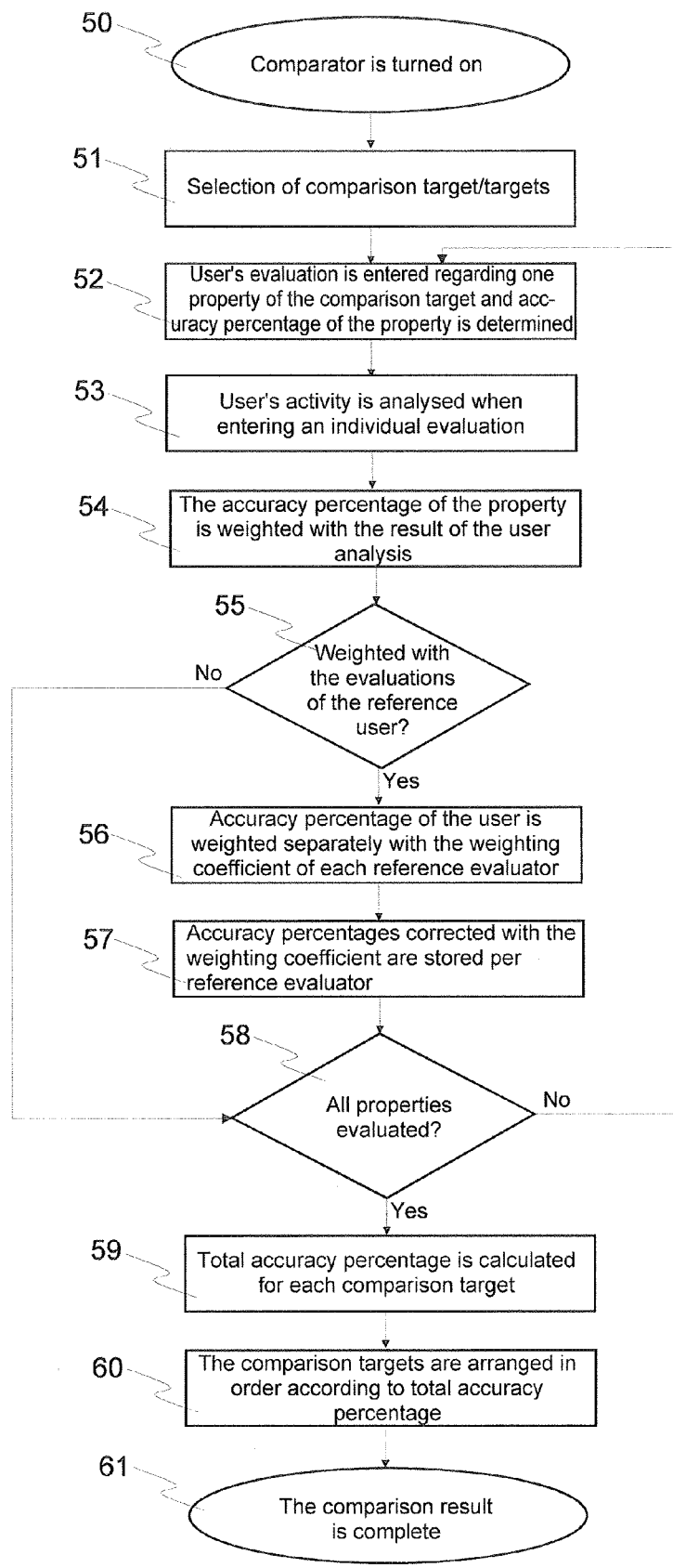
FIG. 5 shows as an exemplary flow chart the functional main steps of the comparator according to the invention, when the actions of the user in connection with giving the evaluations are also utilised in the comparison.

FIG. 5 shows as an exemplary flowchart the main functions of a comparator according to an embodiment of the invention. In the comparator according to this embodiment information obtainable from an analysis of the comparator user's actions registered during the use of the evaluation tool are utilised, from which information property-specific weighting coefficients are formed. Additionally this embodiment can also utilise property-specific weighting coefficients formed from the property evaluations given by the reference user/users.

In step 50 the person performing the comparison starts the comparator according to the invention. In step 51 the user selects the comparison target/targets to be used in the comparator. Each comparison target has advantageously previously been evaluated by at least one so-called reference user, who knows all the properties of the individual comparison target, which properties are utilised in the comparator during the comparison. The evaluations of the selected comparison targets can be performed by different reference evaluators.

In step 52 the user enters his own evaluation in the comparator with his data processing device regarding one property being evaluated. The user can enter his evaluation into the comparator advantageously either using a fourfold or an evaluation line. Both embodiments utilise a stepless graphic response arrangement, whereby the user sets his evaluation result in the graphic evaluation frame created on the screen of his data processing device in a freely selected spot. At the end of the step the congruency, i.e. the accuracy percentage A of the evaluations of the comparator user and at least one reference user or comparison group of the comparison target is calculated in the comparator using the equation (1).

In step 53 the comparator analyses the user's actions in step 52 during the time when the user has given his evaluations of the presented questions or statements. For example the amount of time the user has needed in order to give his evaluation illustrates how certain the user is of the given evaluation. If the user or reference user gives his evaluation quickly, the evaluation can be seen as important and it can be given a high weighting coefficient when calculating the accuracy percentage. If the user or reference user takes long to think about the given evaluation, he does not have a clear opinion about the evaluated property. Thus the weight of the question/evaluation in question can be decreased when calculating the accuracy percentage.

Instead of or in addition to the time used by the comparator user, the movements of the cursor of the user's data processing device on the response table or evaluation line can also be monitored. If the cursor of the data processing device moves back and forth on the response table before the final evaluation is given, the question or property in question can be seen as unimportant (or the user's opinion uncertain) and the weight of it can be decreased when calculating the accuracy percentage. When calculating the weight the distance travelled by the cursor before locking the evaluation can for example be used as a calculation basis.

In step 54 the percentage illustrating the congruency of the property calculated in step 52 is weighted with the weighting coefficient $K_{E1}$ created in step 53 in the comparator, which coefficient depends on the actions of the user. The accuracy percentage result $A_{E1}$ for a single property corrected with the weighting coefficient $K_{E1}$ is stored at least temporarily in the memory part of the server 12 assigned for use by the comparator.

In step 55 a decision is made in the comparator regarding whether the already calculated accuracy percentage $A_{E1}$ of a single property is to be weighted also with weighting coefficients $K_E$ calculated from the reference users' evaluations or not. If the decision in step 55 is that the reference users' weighting coefficients are not utilised, then the comparison process proceeds to step 58.

Step 58 consists of checking in the comparator to see, if the user has given his evaluation of all the properties to be evaluated of the comparison target. If there are still unevaluated properties, the comparison process returns to step 52. If it is in step 58 found that all the properties included in the comparator have been evaluated, the comparison process proceeds to step 59, where a total accuracy percentage $S_{E1}$ is calculated in the comparator from the accuracy percentages $A_{E1}$ of individual properties using the equation (4).

In step 60 the targets being compared are placed in the comparator in an order determined by the total accuracy percentage $S_{E1}$.

In this embodiment the use of the comparator ends in step 61, where the comparison results are presented to the comparator user in the order according to the total accuracy percentage $S_{E1}$ on the screen of his data processing device.

In an advantageous embodiment of the invention a decision is made in step 55 that also the weighting coefficients $K_E$ calculated from the reference users' evaluations are utilised. Thus the comparison process of the comparator proceeds to step 56.

In step 56 the accuracy percentage $A_{E1}$ illustrating the congruency of a single evaluated property, which was calculated in step 54, is weighted in the comparator also with the weighting coefficient $K_E$ determined from the evaluation given by the reference user of the comparison target. As a final result is received an accuracy percentage $A_{E2}$ illustrating the congruency of one evaluated property, corrected with two weighting coefficients.

In step 57 the numerical value $A_{E2}$ illustrating the congruency of one evaluated property, corrected also with the weighting coefficient $K_E$, is stored at least temporarily in the memory part of the server 12 assigned to the comparator.

Step 58 consists of checking whether the comparator user has given his evaluation of all the properties to be evaluated. If even one property to be evaluated is still not evaluated, then the comparison process returns to step 52, where the comparator user gives his evaluation of the next still unevaluated property into the comparator.

If it is in step 58 found in the comparator that all the properties included in the comparator have been evaluated, the comparison process also in this embodiment proceeds to step 59, where a total accuracy percentage $S_{E2}$ taking into account both property-specific weighting coefficients $K_E$ and $K_{E1}$ is calculated.

In step 60 the targets being compared are placed in the comparator in an order determined by the total accuracy percentage $S_{E2}$.

In this embodiment the use of the comparator ends in step 61, where the comparison results are presented to the comparator user in the order according to the total accuracy percentage $S_{E2}$.

It is clear to someone skilled in the art that out of the process steps presented in FIG. 5 the steps 54-55 can be performed also in another order, whereby the weighting coefficients calculated from the reference evaluators' evaluations are first utilised and then it is, if necessary, possible to utilise also the weighting coefficients formed from the data collected in connection with the user's behaviour with the comparator. It is also obvious to someone skilled in the art that the use of weighting coefficients may vary from one property to be evaluated to another. Thus two weighting coefficients are utilised for evaluating one property and either one of the weighting coefficients is utilised for evaluating some other property.

The process steps described in FIGS. 3, 4 and 5 to be implemented in the comparator can be implemented with computer program commands, which are executed in a suitable general-purpose or special-purpose processor. The computer program commands can be stored in a computer-readable media, such as a data disk or a memory, from where the processor of the data processing device can retrieve said computer program commands and execute them. The references to computer-readable media can for example also contain special components, such as programmable USB Flash memories, logic arrays (FPLA), application-specific integrated circuits (ASIC) and signal processors (DSP).

Some advantageous embodiments of the method and device according to the invention have been described above. The invention is not limited to the solutions described above, but the inventive idea can be applied in numerous ways within the scope of the claims.

The invention claimed is:

1. A method for implementing a property comparison between several comparison targets with a comparator residing in a server in a data transfer network, which comparator uses at least a two dimensional graphic evaluation frame, the method comprising
    giving at least one reference evaluation of the properties of a one comparison target by the graphic evaluation frame of a reference user's data processing device and storing the evaluations given as reference in a database of the server implementing the functions of the comparator
    normalizing evaluations describing the degree of importance of the properties of one comparison target included in the reference evaluations with the graphic evaluation frame of the server, so that an average of the importance evaluations of all the properties is at the origin at the center of the used graphic evaluation frame and the standard deviation of the importance evaluations has a predetermined magnitude
    giving an evaluation of an evaluated property of one comparison target utilizing the two dimensional graphic evaluation frame of a user's data processing device, which is connected to the data transfer network, and the evaluation is stored in the server
    determining an accuracy percentage describing the congruency of the evaluations given by the comparator user's data processing device and reference evaluations concerning the same comparison target in the server implementing the comparator
    presenting on the comparator user's data processing device a total accuracy percentage for all the properties obtained from the congruency comparison created in the server,
    correcting the accuracy percentage of at least one property of the comparison target in the server with a weighting coefficient determined at least from the reference evaluations and
    presenting the comparison targets of the comparator in an order determined by a total accuracy percentage corrected with the weighting coefficient on the comparator user's data processing device.

2. The method according to claim 1, wherein an accuracy percentage of the evaluations given by the data processing device of the comparator user and the reference evaluations in the same graphic evaluation frame regarding one property is calculated in the server (12) with an equation:

$$A_E = \left[1 - \frac{|X_K - X_E|}{N}\right] * K_E * 100,$$

in which:
    $A_E$ is the congruency of the evaluation points given by the data processing device of the comparator user and the reference evaluations expressed as an accuracy percentage for one axis of the evaluation frame $X_K$ is the value between 0 and N of the evaluation point given by the data processing device of the comparator user on one axis of the graphic evaluation frame $X_E$ is the value between 0 and N of the evaluation point of the reference evaluation on one axis of the graphic evaluation frame N is an integer number, with which the axis/axes of the graphic evaluation frame are divided into equally large parts, and $K_E$ is a weighting coefficient, which is an importance value of the reference evaluation of the evaluated property, which has been normalised.

3. The method according to claim 2, wherein a total accuracy percentage of all the properties of the comparison target is calculated in the server with an equation:

$$S_E = \sum_{j=1}^{n} \frac{A_{j_e}}{n},$$

in which:

$S_E$ is a total accuracy percentage for all the properties, when the weighting coefficients have been taken into account $A_{j_e}$ is an accuracy percentage of axis j of the graphic evaluation frame, where the weighting coefficient $K_E$ derived from the importance of the evaluated property has been taken into account, and n is the total number of evaluation axes included in all the used graphic evaluation frames.

4. The method according to claim 2, wherein the weighting coefficient $K_E$ is an importance value of a property normalised in the direction of the evaluation axis illustrating the importance of the property defined in the reference evaluation for different properties.

5. The method according to claim 2, wherein the weighting coefficient $K_E$ additionally comprises an additional weighting coefficient $K_{E1}$ determined from the actions performed in the comparator during the evaluation event.

6. The method according to claim 5, wherein the value of the additional weighting coefficient $K_{E1}$ is determined in the server based on the time, which has been used for giving the evaluation of the property to be evaluated.

7. The method according to claim 5, wherein the value of the additional weighting coefficient $K_{E1}$: is determined in the server based on a distance that the cursor used by the comparator user on the data processing device draws during evaluation of the property on the screen of the data processing device.

8. The method according to claim 2, wherein the weighting coefficient $K_E$ is a normalised property importance value calculated in the server, determined from evaluations of different properties given by a comparison group composed of several reference respondents, illustrating the importance of a property in the direction of the evaluation axis illustrating the importance of the property.

9. A data network arrangement for implementing a comparator, which data network arrangement comprises a data transfer network a server, which comprises means for providing at least a two-dimensional graphic evaluation frame as a www-page on the data processing devices of comparator users a database for storing evaluations given with the two-dimensional graphic evaluation frame means for inputting a reference evaluation about a property of one comparison target by the two-dimensional graphic evaluation frame, for storing and comparing the reference evaluation against the corresponding property evaluation inputted by the data processing device of a comparator user means for calculating a property-specific accuracy percentage of the comparison target and means for presenting a comparison result graphically on the screen of the comparator user's data processing device in an order determined by a total accuracy percentages of all comparison targets, and at least one data processing device of a comparator user for the comparator user to give an evaluation with the two-dimensional graphic evaluation frame of at least one property of one compared target, wherein the data network arrangement further comprises in the server means for weighting an accuracy percentage of at least one property of the comparison target with a weighting coefficient determined at least from the reference evaluations and means for presenting the comparison targets in an order determined by a total accuracy percentage corrected with the weighting coefficient on the comparator user's data processing device.

10. The data network arrangement according to claim 9, wherein an accuracy percentage $A_E$ of the evaluations given by the data processing device of the comparator user and the reference evaluations in the same graphic evaluation frame regarding one property is configured to be calculated in the server with an equation:

$$A_E = \left[1 - \frac{|X_K - X_E|}{N}\right] * K_E * 100,$$

$A_E$ is the congruency of the evaluation points given by the data processing device of the comparator user and the reference evaluations expressed as an accuracy percentage for one axis of the graphic evaluation frame $X_K$ is the value between 0 and N of the evaluation point of the given by the data processing device of comparator user on one axis of the graphic evaluation frame $X_E$ is the value between 0 and N of the evaluation point of the reference evaluation on one axis of the graphic evaluation frame N is an integer number, with which the axis of the graphic evaluation frame are divided into equally large parts, and $K_E$ is a weighting coefficient, which is an importance value of the reference use evaluation for the evaluated property, which has been normalised.

11. The data network arrangement according to claim 10, wherein a total accuracy percentage of all the properties of the comparison target is configured to be calculated in the server with an equation:

$$S_E = \sum_{j=1}^{n} \frac{A_{j_e}}{n},$$

in which:

$S_E$ is the total accuracy percentage for all the evaluations, when the weighting coefficients $K_E$ have been taken into account $A_{je}$ is an accuracy percentage of axis j of the graphic evaluation frame, where the weighting coefficient $K_E$ has been taken into account, and n is the total number of evaluation axes included in all the used graphic evaluation frames.

12. The data network arrangement according to claim 10, wherein the weighting coefficient $K_E$ is an importance value of a property normalised in the direction of the evaluation axis illustrating the importance of the property defined by the reference evaluation for different properties.

13. The data network arrangement according to claim 10, wherein the weighting coefficient $K_E$ additionally comprises an additional correction coefficient $K_{E1}$ determined from the actions performed in the comparator during the evaluation event.

14. The data network arrangement according to claim 13, wherein the value of the additional correction coefficient $K_{E1}$ is configured to be determined in the server based on the time, which has been used in the comparator for giving the evaluation of the property.

15. The data network arrangement according to claim 13, wherein the value of the additional correction coefficient $K_{E1}$ is configured to be determined in the server based on a distance that the cursor on the data processing device of the comparator user draws while making the evaluation of the property being compared.

16. The data network arrangement according to claim 10, wherein the weighting coefficient $K_E$ is a normalised property importance value determined in the server from evaluations of different properties given by a comparison group composed of several reference respondents, illustrating the importance of a property in the direction of the evaluation axis illustrating the importance of the property.

17. The data network arrangement according to claim 10, wherein the value of the weighting coefficient $K_E$ in the case of a one-dimensional evaluation line is larger in both ends of the evaluation line than in the origin situated in the middle of the evaluation line.

18. A non-transitory computer readable medium, comprising a computer program comprising computer program code, which computer program code is configured to perform all the steps of the method defined in claim 1 when said computer program is run on a computer.

\* \* \* \* \*